(12) United States Patent
Takeda et al.

(10) Patent No.: US 7,540,805 B2
(45) Date of Patent: Jun. 2, 2009

(54) GAME DEVICE, GAME CONTROL METHOD, PROGRAM AND STORAGE MEDIUM

(75) Inventors: Yohsuke Takeda, Tokyo (JP); Daichi Katagiri, Tokyo (JP); Hiroshi Masui, Tokyo (JP)

(73) Assignee: Sega Corporation, Tokyo (JP)

( * ) Notice: Subject to any disclaimer, the term of this patent is extended or adjusted under 35 U.S.C. 154(b) by 399 days.

(21) Appl. No.: 11/060,809

(22) Filed: Feb. 18, 2005

(65) Prior Publication Data

US 2005/0245304 A1 Nov. 3, 2005

(30) Foreign Application Priority Data

Feb. 19, 2004 (JP) ............................. 2004-043292

(51) Int. Cl.
*A63F 13/00* (2006.01)
(52) U.S. Cl. .................... 463/30; 463/1; 463/8; 463/31
(58) Field of Classification Search ................. 463/2–8, 463/40–42, 43, 1, 30, 23, 31
See application file for complete search history.

(56) References Cited

U.S. PATENT DOCUMENTS

| | | | | | |
|---|---|---|---|---|---|
| 6,146,269 | A | * | 11/2000 | Morihira | 463/8 |
| 6,354,940 | B1 | * | 3/2002 | Itou et al. | 463/8 |
| 6,764,401 | B1 | * | 7/2004 | Akatsuka | 463/36 |
| 2001/0029201 | A1 | * | 10/2001 | Minami | 463/31 |
| 2002/0090995 | A1 | * | 7/2002 | Haga et al. | 463/31 |
| 2003/0236111 | A1 | * | 12/2003 | Otani et al. | 463/8 |
| 2004/0014513 | A1 | * | 1/2004 | Boon | 463/8 |

FOREIGN PATENT DOCUMENTS

| | | |
|---|---|---|
| EP | 0 885 638 A1 | 12/1998 |
| EP | 0 991 007 B1 | 10/2002 |

OTHER PUBLICATIONS

Virtua Fighter 2 Manual—http://jarcas.dreamhosters.com/rdocs/Virtua_Fighter_2_-_Manual_-_PC.pdf.*
NBA Street vol. 2—Cheats—http://www.cheatscodesguides.com/playstation-2-cheats/nba-street-vol-2/.*

* cited by examiner

*Primary Examiner*—Scott Jones
*Assistant Examiner*—Damon Pierce
(74) *Attorney, Agent, or Firm*—Dickstein Shapiro LLP

(57) ABSTRACT

The game device comprises display means for displaying game images, operation means operated by game players, and control means for controlling a game. On the game device, a competition game which is played by a plurality of game players is made to win and lose. The game device further comprises storage means which count values of a prescribed trick played by the game players, nicknames related to the prescribed trick, and nicknaming conditions for giving the nicknames. The control means judges based on operation states of the operation means operated by the game players whether or not the prescribed trick has been played by the game players in the progress of the game, renews the count values when it is judged that the prescribed trick has been played, and gives the nickname to the game players when the count values have satisfied the nicknaming conditions. The display means displays in the game images the nicknames, related to the game players. The game device can give a name expressing individuality of the game player.

5 Claims, 12 Drawing Sheets

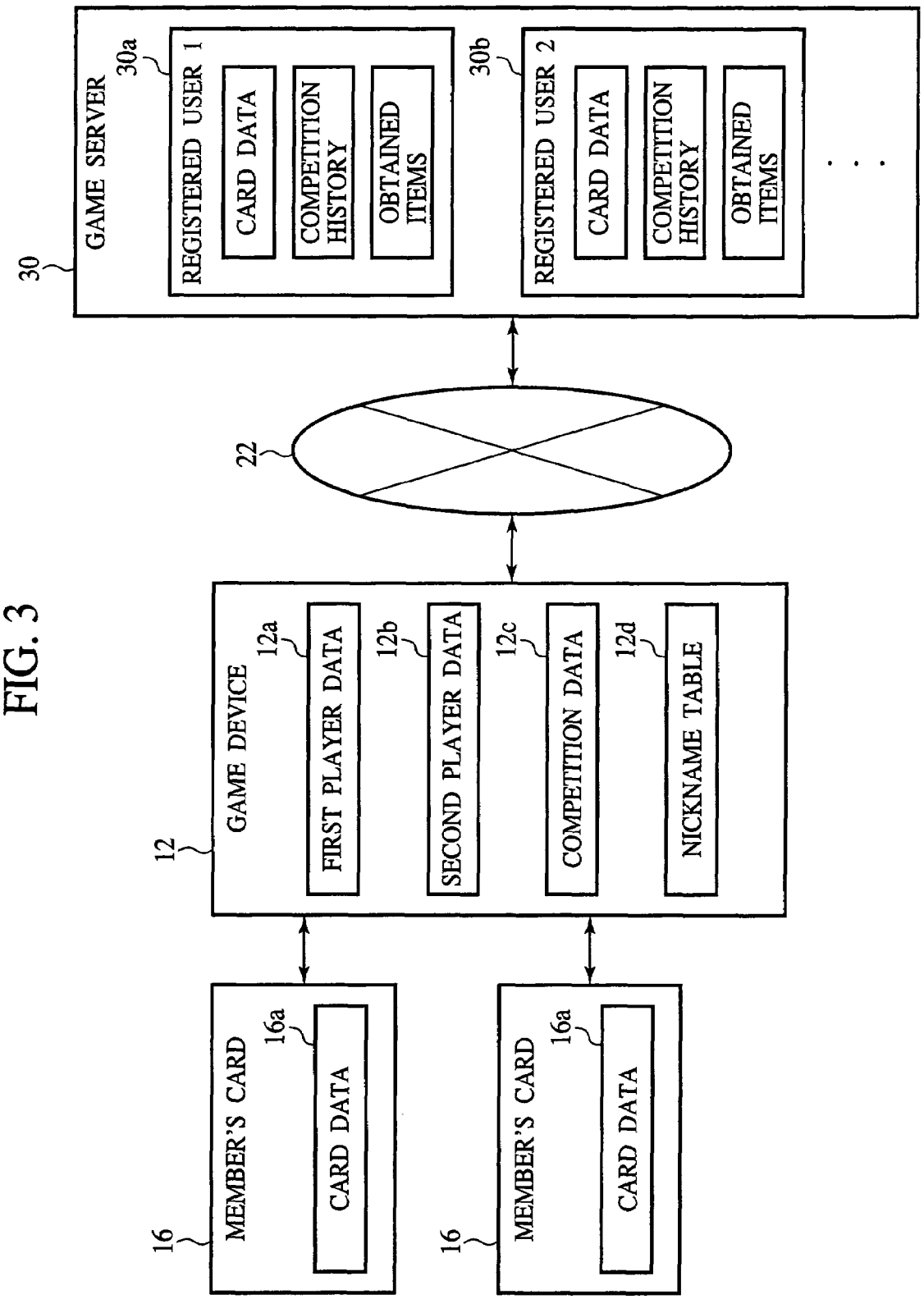

FIG. 4A

| PLAYER INFORMATION | ID |
| --- | --- |
|  | PASS WORD |
|  | ACCOUNT NAME |
|  | USER INFORMATION |
| COMPETITION RESULT DATA | NUMBER OF MATCHES |
|  | NUMBER OF WINS |
|  | RANK |
| CHARACTER SETTING DATA | CHARACTER NAME |
|  | COSTUME |
|  | HELD ITEM |
| NICKNAME | NICKNAME 1 |
|  | NICKNAME 2 |

| PLAYER INFORMATION | ID |
| --- | --- |
|  | PASS WORD |
|  | ACCOUNT NAME |
|  | USER INFORMATION |
| COMPETITION RESULT DATA | NUMBER OF MATCHES |
|  | NUMBER OF WINS |
|  | RANK |
| CHARACTER SETTING DATA | CHARACTER NAME |
|  | COSTUME |
|  | HELD ITEM |
| NICKNAME | NICKNAME 1 |
|  | NICKNAME 2 |
| COMPETITION HISTORY 1 | COMPETITOR USER |
|  | COMPETITION RESULT |
|  | COMPETITION PERIOD OF TIME |
|  | WINNING TRICK |
|  | GENERATED NICKNAME |
| COMPETITION HISTORY 2 | COMPETITOR USER |
|  | COMPETITION RESULT |
|  | COMPETITION PERIOD OF TIME |
|  | WINNING TRICK |
|  | GENERATED NICKNAME |
| COMPETITION HISTORY 3 | COMPETITOR USER |
|  | COMPETITION RESULT |
|  | ... |
|  |  |
|  |  |
|  |  |

| COMPETITOR PLAYER NAME | PLAYER 1 | PLAYER 2 |
|---|---|---|
| COMPETITION TIME | COMPETITION START TIME | COMPETITION FINISH TIME |
| WIN AND LOSS | WINNER | LOSER |
| WINNING TRICK | | |
| PLAY PROCESS | | |
| THROW | THROW COUNTER | THROW COUNTER |
| | THROW NICKNAME | THROW NICKNAME |
| THROW EVASION | THROW EVASION COUNTER | THROW EVASION COUNTER |
| | THROW EVASION NICKNAME | THROW EVASION NICKNAME |
| GUARD | GUARD COUNTER | GUARD COUNTER |
| | GUARD NICKNAME | GUARD NICKNAME |
| REACTION | REACTION COUNTER | REACTION COUNTER |
| | REACTION NICKNAME | REACTION NICKNAME |
| RETREAT | RETREAT COUNTER | RETREAT COUNTER |
| | RETREAT NICKNAME | RETREAT NICKNAME |
| SYNTHESIS | SYNTHESIS NICKNAME | |

| | THROW | THROW EVASION | CONTINUOUS TRICK | AFTER DEFENSE ATTACK | TREAT | DEFENSE | LARGE TRICK |
|---|---|---|---|---|---|---|---|
| LEVEL 1 | THROW CONDITION 1 | THROW EVASION CONDITION 1 | CONTINUOUS CONDITION 1 | COUNTERATTACK CONDITION 1 | TREAT CONDITION 1 | DEFENSE CONDITION 1 | LARGE TRICK CONDITION 1 |
| | THROW APPRENTICE | TRICK APPRENTICE | CONTINUOUS ATTACK APPRENTICE | COUNTERATTACK APPRENTICE | TACTICIAN APPRENTICE | DEFENSE APPRENTICE | ONE BLOW APPRENTICE |
| LEVEL 2 | THROW CONDITION 2 | THROW EVASION CONDITION 2 | CONTINUOUS CONDITION 2 | COUNTERATTACK CONDITION 2 | TREAT CONDITION 2 | DEFENSE CONDITION 2 | LARGE TRICK CONDITION 2 |
| | THROW DISCIPLE | TRICK DISCIPLE | CONTINUOUS ATTACK DISCIPLE | COUNTERATTACK DISCIPLE | TACTICIAN DISCIPLE | DEFENSE DISCIPLE | ONE BLOW DISCIPLE |
| LEVEL 3 | THROW CONDITION 3 | THROW EVASION CONDITION 3 | CONTINUOUS CONDITION 3 | COUNTERATTACK CONDITION 3 | TREAT CONDITION 3 | DEFENSE CONDITION 3 | LARGE TRICK CONDITION 3 |
| | THROW MASTER | TRICK MASTER | CONTINUOUS ATTACK MASTER | COUNTERATTACK MASTER | TACTICIAN MASTER | DEFENSE MASTER | ONE BLOW MASTER |
| LEVEL 4 | THROW CONDITION 4 | THROW EVASION CONDITION 4 | CONTINUOUS CONDITION 4 | COUNTERATTACK CONDITION 4 | TREAT CONDITION 4 | DEFENSE CONDITION 4 | LARGE TRICK CONDITION 4 |
| | THROW TEACHER | TRICK TEACHER | CONTINUOUS ATTACK TEACHER | COUNTERATTACK TEACHER | TACTICIAN TEACHER | DEFENSE TEACHER | ONE BLOW TEACHER |
| LEVEL 5 | THROW CONDITION 5 | THROW EVASION CONDITION 5 | CONTINUOUS CONDITION 5 | COUNTERATTACK CONDITION 5 | TREAT CONDITION 5 | DEFENSE CONDITION 5 | LARGE TRICK CONDITION 5 |
| | THROW CHAMPION | TRICK CHAMPION | CONTINUOUS ATTACK CHAMPION | COUNTERATTACK CHAMPION | TACTICIAN CHAMPION | DEFENSE CHAMPION | ONE BLOW CHAMPION |

12d

GAME DEVICE, GAME CONTROL METHOD, PROGRAM AND STORAGE MEDIUM

BACKGROUND OF THE INVENTION

The present invention relates to a game device, game control method, a program and a storage medium, more specifically a game device which gives a suitable name to a game player, a game control method, a program and a storage medium.

Conventionally, in fighting games, for example, a game player selects his favorite character out of a plurality of characters provided by a game device. The game player operates his character on the game screens to fight with the character of an opponent.

A plurality of characters provided by the game device have looks and individualities characteristic of the plurality of characters, and their own names, which facilitates confirming which characters are fighting on the game screens.

However, the number of characters provided by the game device is limited. Game players who compete with each other often select one and the same character. Accordingly, names which discriminate the game players are necessary. Conventionally, when a game player takes part in a fighting game, he registers in advance his favorite name as his account name. The account name is displayed to discriminate the game player.

The patent reference which the inventors are aware of is Specification of Japanese Patent Application Unexamined Publication No. 2001-239062.

However, the conventional art can discriminate players competing with each other but cannot make what the game players are, i.e., individualities of the game players known.

SUMMARY OF THE INVENTION

An object of the present invention is to provide a game device, a game control method, a program and a storage medium, which can give a name expressing individuality of the game player.

The above-described object is attained by a game device on which a competitive game is played by a plurality of game players and which comprises control means for controlling the game by operation means operated by the game players and displaying game images on display means, further comprising: storage means for storing count numbers of times of a prescribed trick, a nickname related to the prescribed trick, and a nicknaming condition for giving the nickname, the control means judging whether or not the prescribed trick has been played, based on operation states of the operation means by the game players in the progress of the game, renewing the count value when it is judged that the prescribed trick has been played, and giving the nickname to the game player when the count value has satisfied the nicknaming condition, and the display means displaying on the game screen the nickname related to the game player.

In the above-described game device it is possible that the prescribed trick is a trick generated in the game of the competitive game, the nicknaming condition includes a plurality of nicknaming conditions corresponding to levels of the prescribed trick, and the nicknames are different from one another corresponding to the plurality of nicknaming conditions.

In the above-described game device it is possible that the control means accumulates the count numbers for a plurality of times of the competitive game and judges based on the accumulated count values whether or not the nicknaming condition is satisfied.

The above-described object is attained by a game control method for controlling a competitive game played by a plurality of game players to decide the win and loss on a game device comprising control means for controlling the game by operation means operated by the game player and displaying a game image on display means, count values of times of a prescribed trick, a nickname related to the prescribed trick and a nicknaming condition for giving the nickname being stored, the method comprising the steps of: judging whether or not the prescribed trick has been played, based on operation states of the operation means operated by the game players in the game; renewing the count value when it is judged that the prescribed trick has been played; giving the nickname to the game player when the count value satisfies the nicknaming condition, and displaying on the game image the nickname associated with the game player.

In the above-described game control method it is possible that the prescribed trick is a trick generated in the game of the competitive game, the nicknaming condition includes a plurality of nicknaming conditions corresponding to levels of the prescribed trick, and the nicknames are different from one another corresponding to said plurality of nicknaming conditions.

The above-described game control method further comprises the steps of: accumulating the count values for plural times of the competitive game; and judging whether or not the nicknaming condition is satisfied, based on the accumulated count value.

The above-described object is attained by a program for executing a competitive game in which a plurality of game players compete to decide the win and loss on a game device comprising control means for controlling the game by operations of operation means by the game player and displaying a game image on display means, count value of times of a prescribed trick having been played, a nickname related to the prescribed trick and a nicknaming condition for giving the nicknames being stored, the program permitting the game device to execute the steps of: judging whether or not the prescribed trick has been played, based on operation states of the operation means operated by the game player in the progress of the game; renewing the count value when the count value has been satisfied the nicknaming condition; and giving the nicknames to the game player when the count value satisfies the nicknaming condition; and displaying the nicknames on the game images, related to the game players.

The above-described object is attained by a game program which controls the progress of a game, based on an operational input made by a game player and can be executed by a computer, comprising: the first step of storing in storage means game progress count value and name information set corresponding respectively to a plurality of game progress conditions; the second step of judging whether or not a prescribed operational input has been made; the third step of advancing the game, based on the prescribed operational input when it is judged that the prescribed operational input has been made in the second step; the fourth step of judging whether or not the progress of the game has satisfied any one of said plurality game progress conditions; the fifth step of renewing, when it is judged that any one of said plurality of game progress conditions has been satisfied, the stored game progress count value corresponding to the satisfied game progress condition; the sixth step of judging whether or not the game progress count value has become a prescribed value;

the seventh step of reading from the storage means the stored name information corresponding to the game progress condition when the game progress count value has become the prescribed value in the sixth step; and the eighth step of generating and outputting images or sounds corresponding to the read name information.

The above-described object is attained by a game information processing device comprising control means for executing a game program for controlling the progress of a game, based on operation input made by game players, the game information processing device comprising storage means for storing game progress count values and name information which are set respectively corresponding to a plurality game progress conditions, the control means executing game program comprising: the first step of judging whether or not a prescribed operational input has been made; the second step of advancing the game, based on the prescribed operational input when it is judged that the prescribed operational input has been made in the second step; the third step of judging whether or not the progress of the game has satisfied any one of said plurality game progress conditions; the fourth step of renewing, when it is judged that any one of said plurality of game progress conditions has been satisfied, the stored game progress count value corresponding to the satisfied game progress condition; the fifth step of judging whether or not the game progress count value has become a prescribed value; the sixth step of reading from the storage means the stored name information corresponding to the game progress condition when the game progress count value has become the prescribed value in the sixth step; and the seventh step of generating and outputting images or sounds corresponding to the read name information.

As described above, according to the present invention, a nickname expressing individuality of a game player is given to the game player in addition to a player character name, an account name, rank, etc., whereby the individuality of competitor can be known in advance, which makes the competitive game musing.

BRIEF DESCRIPTION OF THE DRAWINGS

FIG. 3 is a view explaining the relationships among various data of a fighting gate of the embodiment of the present invention.

FIG. 4 is views detailing the card data and user data of the fighting gate of the embodiment of the present invention.

FIG. 5 is views detailing the competition data and the nickname table of the fighting gate of the embodiment of the present invention.

DETAILED DESCRIPTION OF THE INVENTION

An Embodiment

The game device according to one embodiment of the present invention will be explained with reference to FIGS. 1 to 11.

(Summary of the Game System)

Figure 1:
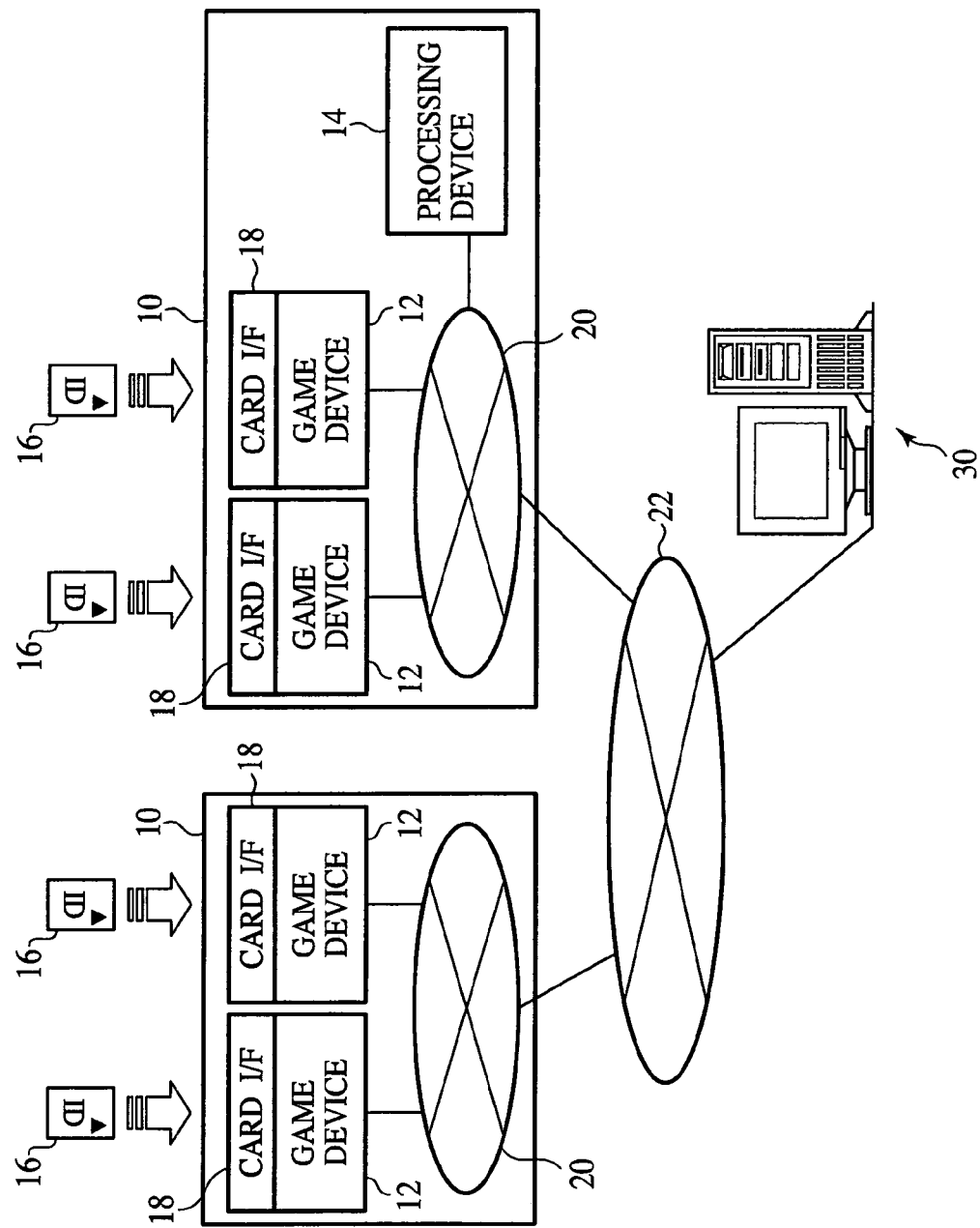
FIG. 1 is a view illustrating the constitution of the game system according to one embodiment of the present invention.

The structure of the network of the game system according to the present embodiment will be explained with reference to FIG. 1.

Amusement facilities 10 are located, e.g., places in Japan (the respective prefectures, the respective cities, down and villages, the Tokyo 23 wards, etc.). In each amusement facilities 10 there are installed a plurality of game devices 12. In each amusement facilities 10, in addition to the game devices 12, there is installed a processing system 14 which makes displays, etc. of the contents of a game being played on the respective game devices. In the amusement facilities 10 with the processing system 14, the spectators watch the display monitor (not illustrated) of the processing system 14 to see games played by other game players.

The game device 12 is, e.g., arcade game machines for commercial use, and game players insert coins to play competitive games in which the game players compete with other game players, such as fighting games, race games, mah-jongg games, etc.

The game device 12 includes a card I/F (interface) 18 for reading a member's card 16. The member's card 16 is an IC card with IC chips of, e.g., a storage memory, a CPU for processing information, and others incorporated, a magnetic card, a card information is optically written in and read from, or others. The member's card 16 is not essentially card-shaped as long as the member's card 16 is a storage medium. A specific ID is assigned and stored in the storage medium.

The respective game devices 12 in each amusement facilities 10 are connected to a LAN 20 installed in the amusement facilities 10 so that the respective game devices 12 can communicate mutually with the other game devices 12 in the amusement facilities 10. The LAN 20 of each amusement facilities 10 is connected to an internet 22 so that the game devices 12 of each amusement facilities 10 can communicate mutually with the game devices 12 of the other amusement facilities 10. Accordingly, arbitrary ones of the game devices, which are located even in the amusement facilities located remote from each other, can transmit and receive data through the communication network, whereby a common competitive gate can be played between the arbitrary game devices.

A game player who has come to the amusement facilities 10 sits at the game device 12 inserts coins and operates the touch panel, selection buttons, execution buttons, etc. to play a competitive game with other game players.

A game server 30 is connected to the internet 22. The game server 30 collects play data generated when the game devices 12 execute games through the internet 22 and stores and administers the play data.

The game server 30 stores various data of respective players. The various data will be detailed later.

The game system of the present embodiment does not essentially include the commercial game devices and the LAN 20 installed in amusement facilities but may be given to the communication of domestic game devices, personal computers, etc. with other domestic game devices and commercial game devices through communication networks, such as LANs and/or internets.

(Constitution of the Game Device)

Figure 2:
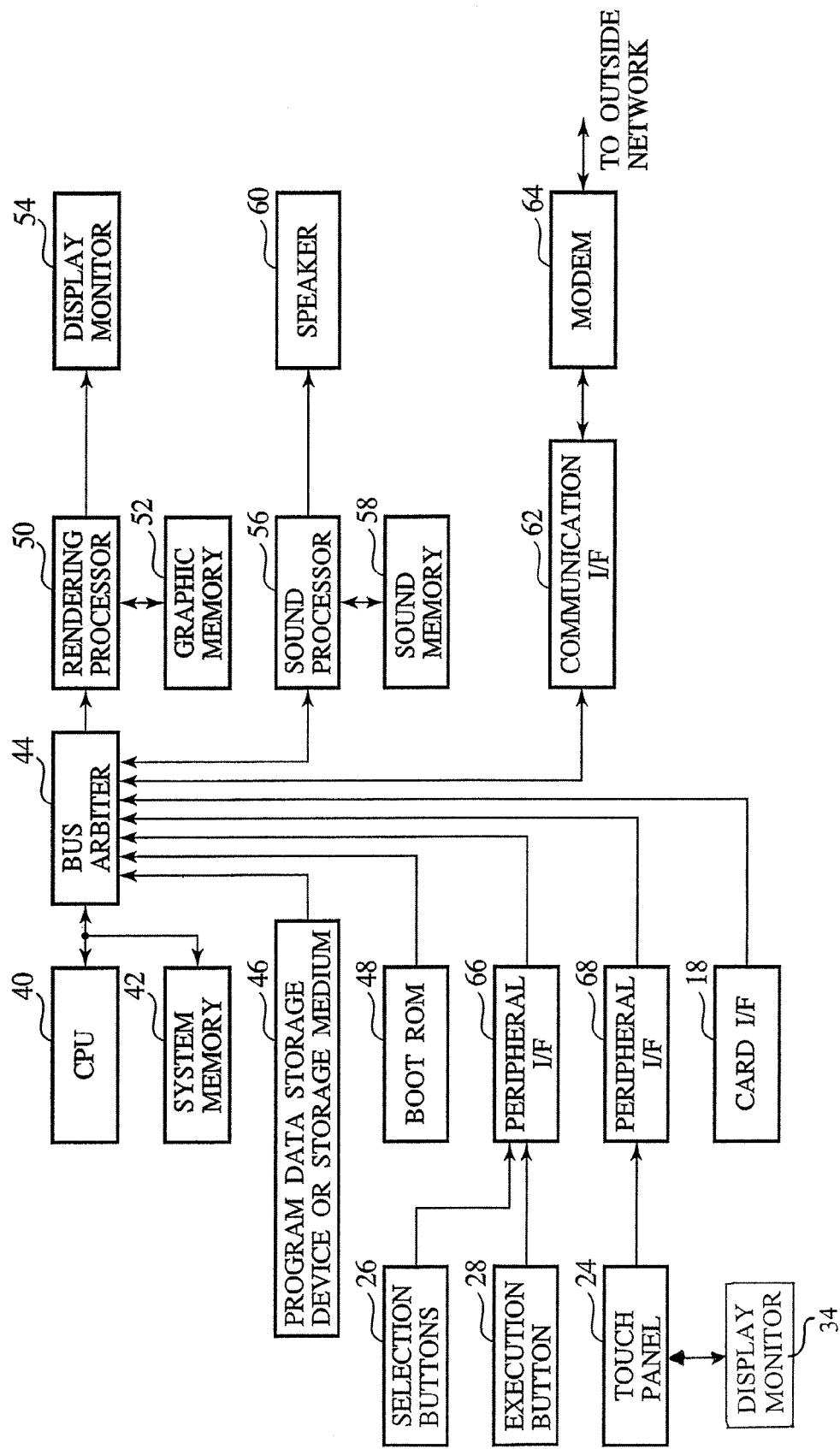
FIG. 2 is a block diagram of the game device according to the embodiment of the present invention, which illustrates the constitution of the game device.

The constitution of the game device according to the present embodiment will be explained with reference to FIG. 2.

The game device 12 includes a display monitor 34 for displaying game contents, a touch panel 24 which is disposed on the display monitor 34 and with which a game player operates a game, a coin slot (not illustrated) coins are inserted into, a card I/F for reading a member's card 16, and selection buttons 26 and execution buttons 28.

The game device 12 further comprises a CPU 40 which executes a game program, generally controls the system and computes coordinates for identifying display positions of objects to be displayed as screens, etc., a system memory (RAM) 42 used as a buffer memory for storing programs and data necessary for the CPU to make the processing, which are connected commonly to a bus line to be connected to bus arbiter 44. The bus arbiter 44 controls the flows of programs and data to the respective blocks of the game device 12 and outside devices connected to the game device 12.

The bus arbiter 44 is connected via bus line to a program data storage device storing game programs and data (including image data and music data) or a storage medium (including an optical disc for driving CD-ROMs, etc., a game storage medium, an optical disc drive, etc.) 46, and a BOOTROM 48 storing programs and data for actuating the game device.

A rendering processor 50 for reproducing image (MOVIE) data read from the program data storage device or the storage medium 46 and producing images to be displayed in accordance with operations of game players and game progress, and a graphic memory 52 for storing graphic data, etc. necessary for the rendering processor 50 to produce images are connected are connected to the bus arbiter 44. Image signals outputted from the rendering processor 50 are converted from digital signals to analogy signals by a video DAC (not illustrated) to be outputted to a display monitor 54.

A sound processor 56 for reproducing music data read from the program data storage device or the storage medium 46 and producing effect sounds and sounds in accordance with operations by game players and game progress, and a sound memory 58 for storing sound data, etc. necessary for the sound processor 56 to produce effect sounds and sounds are connected to the bus arbiter 44. The sound signals outputted from the sound processor 56 are converted from digital signals to analog signals by an audio DAC (not illustrated) to be putted to speakers 60.

A communication interface 62 is connected to the bus arbiter 44. The communication interface 62 is to be connected to an outside network, such as a telephone circuit or others, via a modem 64. The game device 12 is connected to an internet via the telephone circuit and can communicate with other game devices 12, network servers 30, etc. The communication interface 62 and the modem 64 use telephone circuits but may use other communication means, such as cable modems using terminal adapters (TA), rooters using telephone circuits, cable modems using cable television circuits, wireless communication means using portable telephones and PHS's, optical fiber communication means using optical fibers, and other communication means.

Depending on specifications of games, the communication interface 62 and the modem 64 are not installed in the game device.

The selection buttons 26 and the execution buttons 28 are connected to the bus arbiter 44 via a peripheral I/F (interface) 66. The peripheral I/F 66 outputs to CPU signals for controlling the game devices 12 and machines and tools connected to the outside in accordance with operations by game players.

The touch panel 24 is connected to the bus arbiter 44 via a peripheral I/F 68. A game player touches the touch panel 24 with the fingers to input various operations. As does the peripheral I/F 66, the peripheral I/F 68 outputs to the CPU 40 signals for controlling the game devices 12 and the machines and tools connected to the outside in accordance with operations of game players.

Depending on specifications of games, the peripheral I/F 68 and the touch panel 24 are not installed in the game devices.

A card I/F 18 for reading a members card 16 is connected to the bus arbiter 44. A backup memory (not illustrated) is connected to the bus arbiter 44, and stores results of games, etc. The backup memory can be provided by a system memory (RAM).

The game devices 12 are not essentially game devices installed in amusement facilities and stores, such as game cafes, etc. and can be game information processing devices, such as domestic game devices, personal computers, electronic devices, such as portable electronic game machines, portable telephones, PDA, etc., tools, etc.

The member's cards 16 can be storage mediums in which the game devices can store data, such as backup memories, e.g., memory cards, memory cartridges, etc. which can be loaded and unloaded in and from hard disc devices and the game devices, memories incorporated in the game devices, etc.

(Fighting Game)

Figure 6:
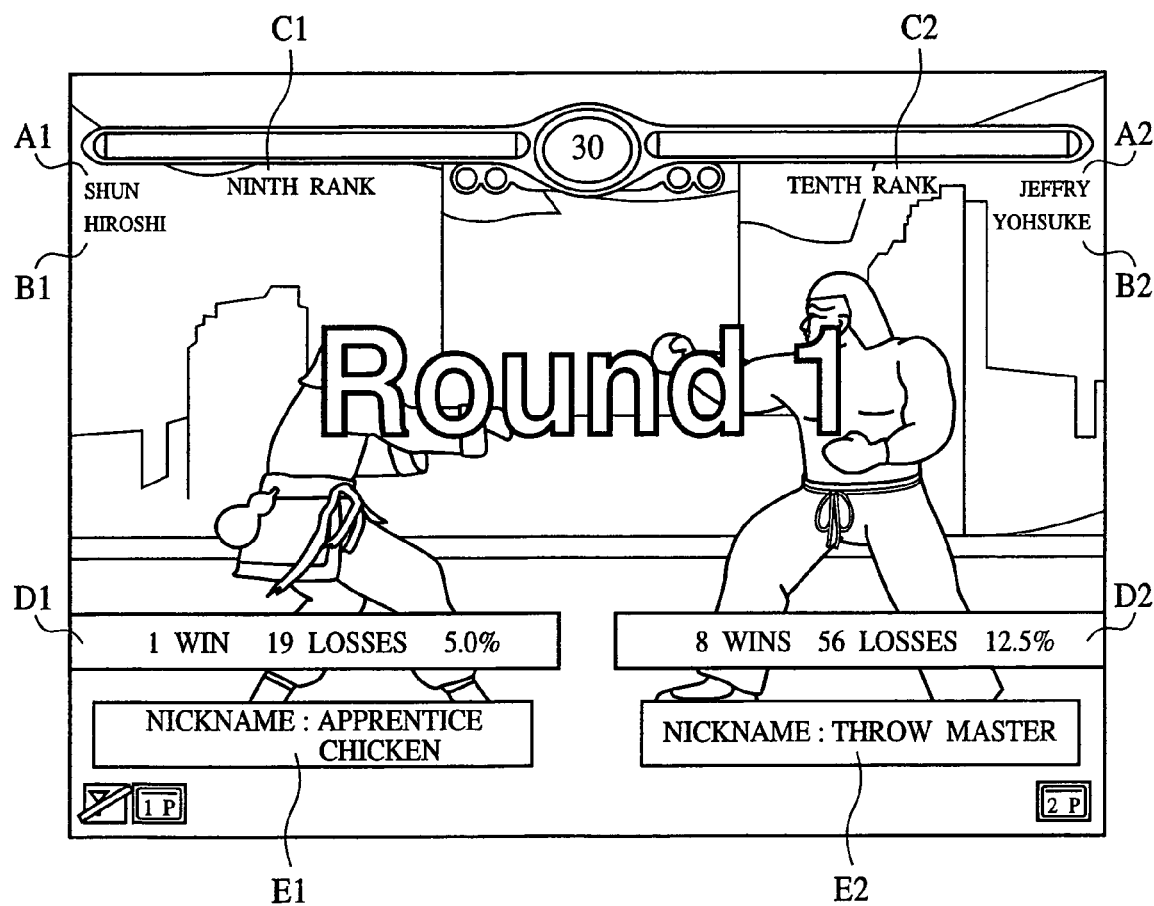
FIG. 6 is a view of a game screen of the fighting gate of the embodiment of the present invention.
Figure 7:
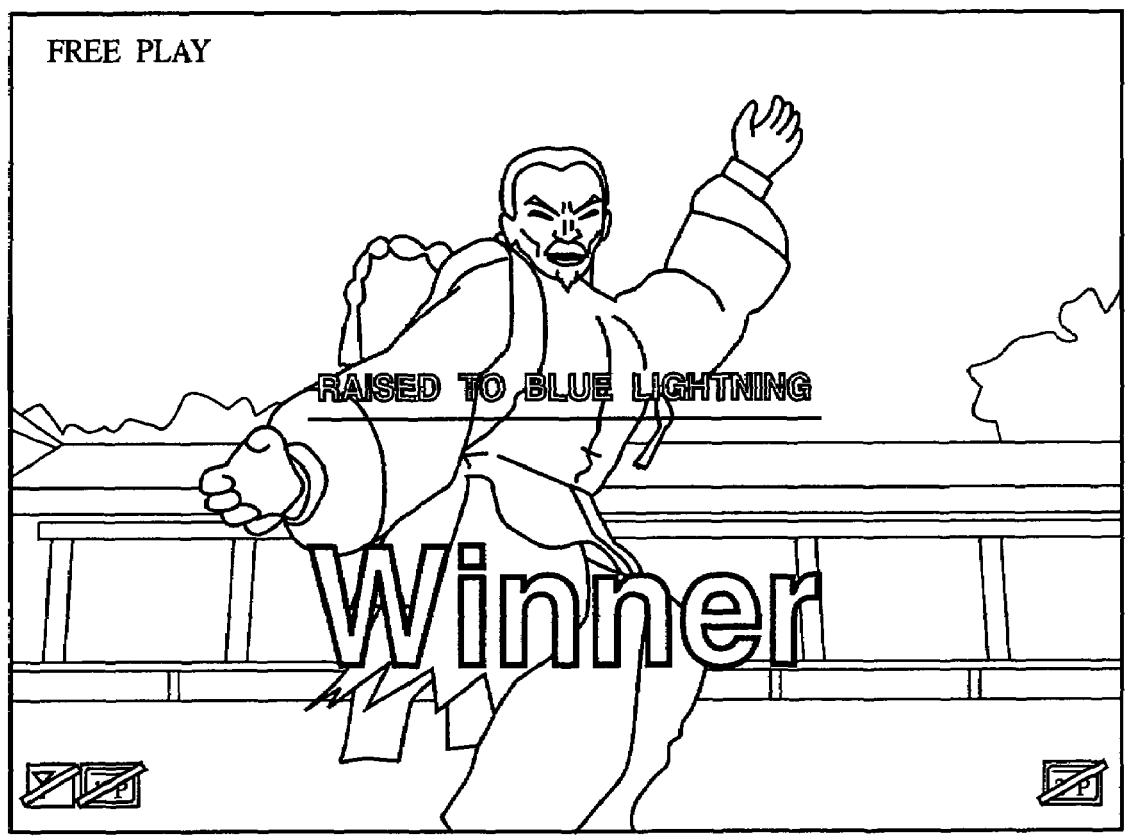
FIG. 7 is a view of a game screen of the fighting gate of the embodiment of the present invention.
Figure 8:
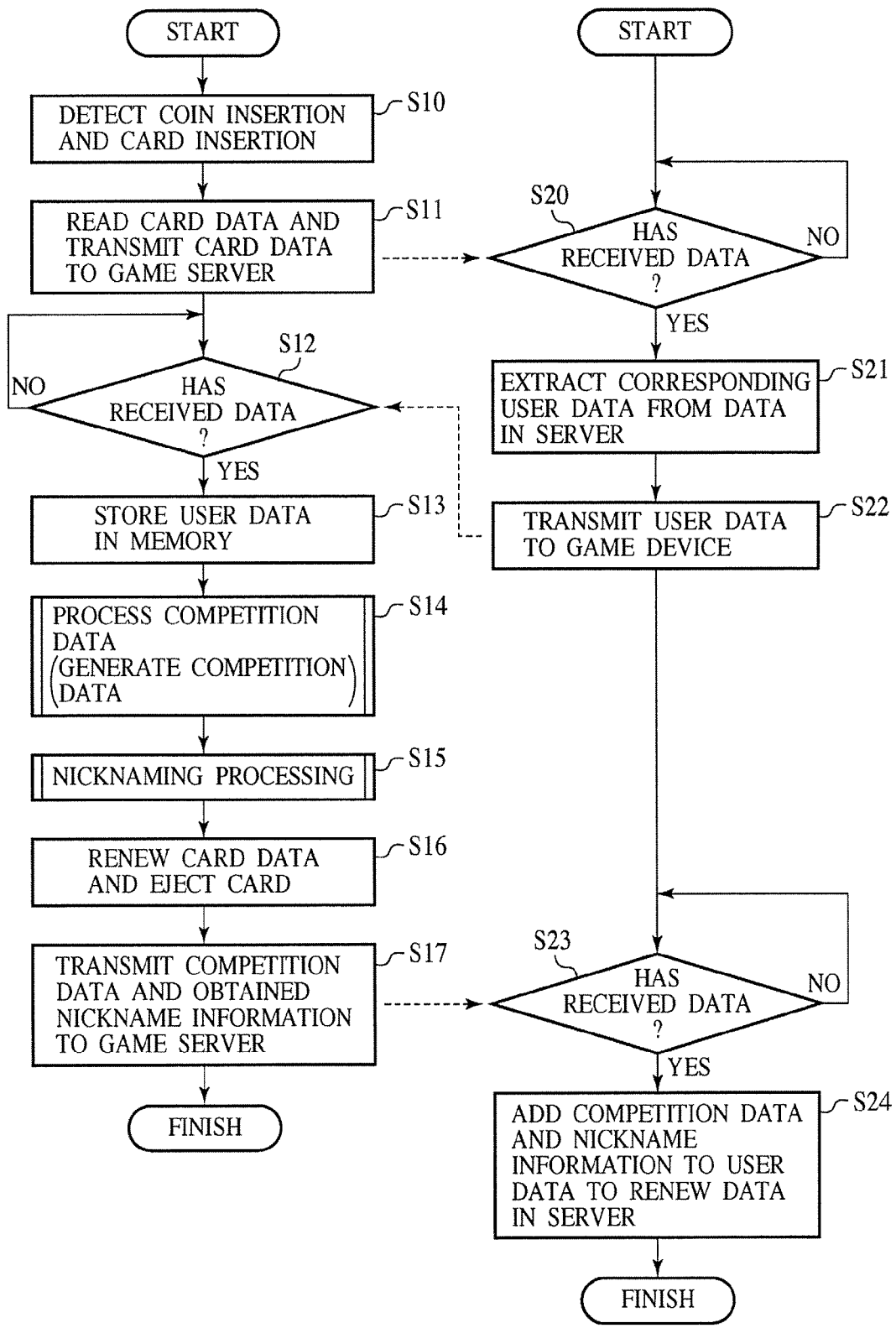
FIG. 8 is flow chart of the flow of the fighting game of the embodiment of the present invention.
Figure 9:
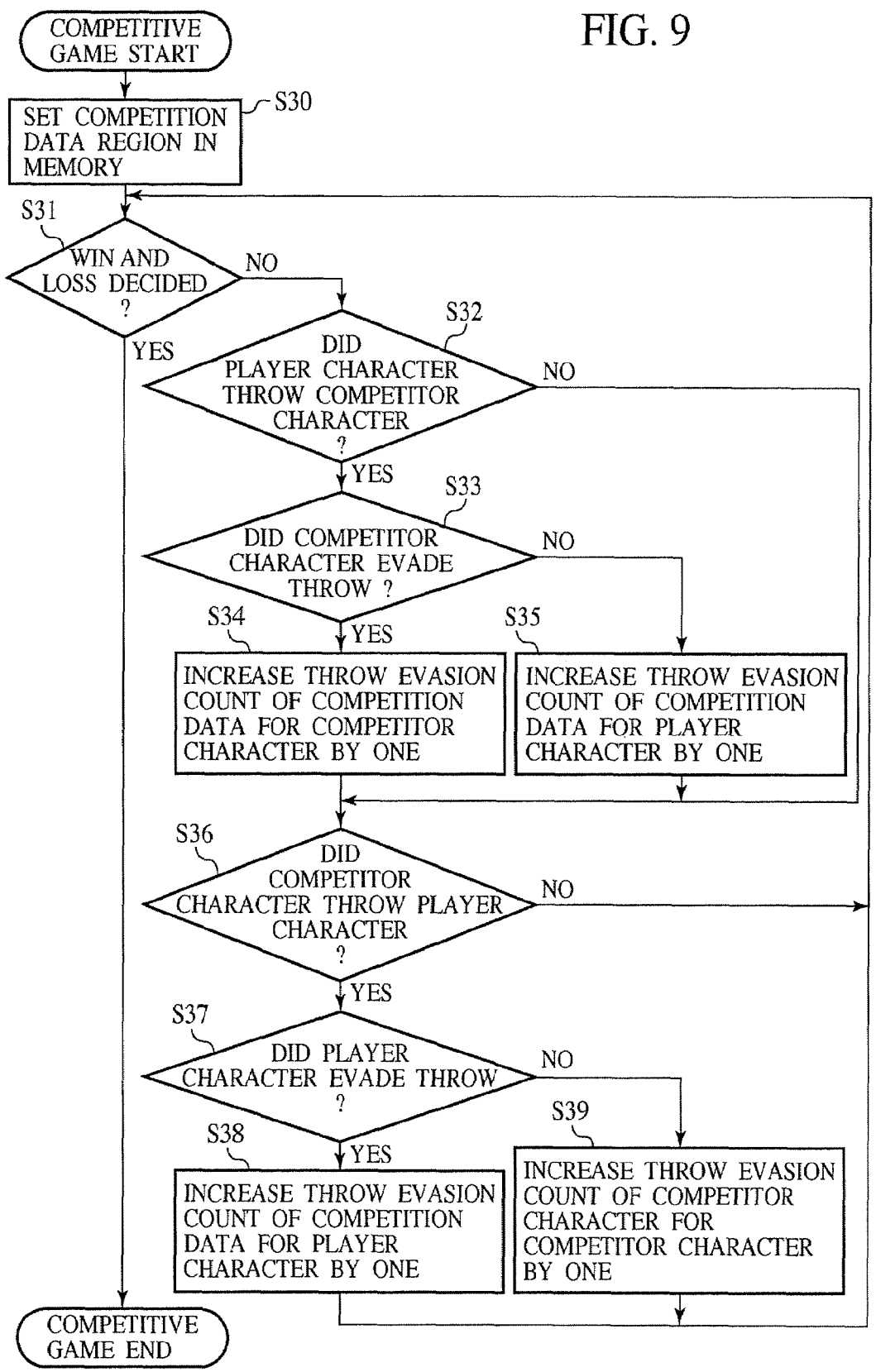
FIG. 9 is a flow chart of the flow of the competitive game processing of the fighting game of the embodiment of the present invention.
Figure 10:
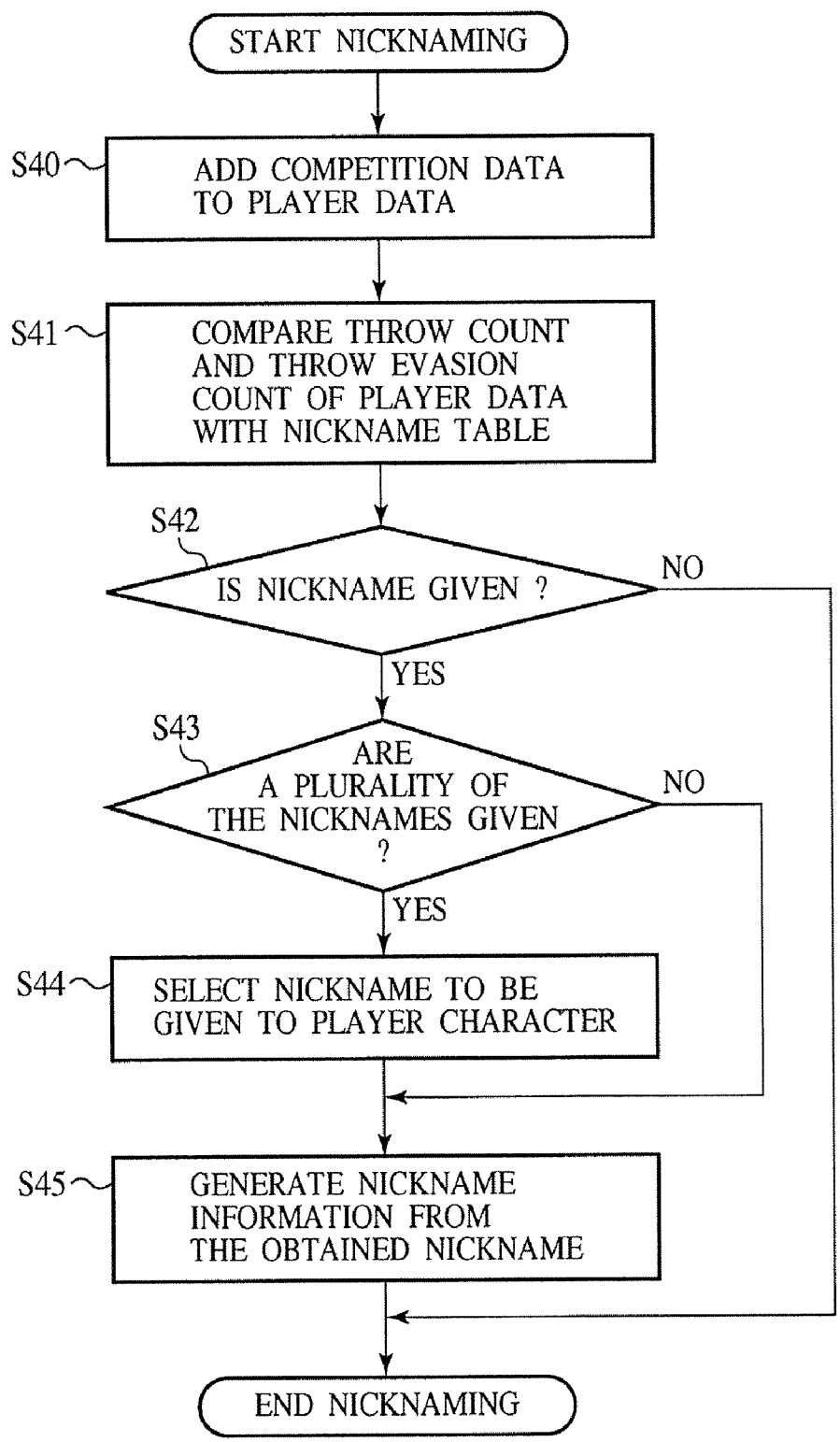
FIG. 10 is a flow chart of the flow of the nicknaming processing of the fighting gate of the embodiment of the present invention.

As one example of the competitive game according to the present embedment, a fighting game will be detailed with reference to FIGS. 3 to 10. FIG. 3 is an explanatory view of relationships among various data of the fighting game according to the present embodiment. FIGS. 4 and 5 are explanatory views of details of the various data. FIGS. 6 and 7 are views of game screens of the fighting game according to the present embodiment. FIGS. 8 to 10 are flow charts of the fighting game according to the present embodiment.

(Various Data of the Fighting Game)

Various data of the fighting game according to the present embodiment will be explained with reference to FIGS. 3 to 5.

In the fighting game according to the present embodiment, the game players prepare their own member's cards 16. The game players insert their member's cards into the game devices or others to record their information into the member's cards by operating input switches or others. The game devices are connected to the internet 22, and the game server 30 is connected to the internet 22.

As illustrated in FIG. 3, the member's cards are inserted into the game devices 12, whereby the game devices 12 can read the data of the member's cards 16 and write data into the member's cards. The game devices 12 and the game server 30 can receive various data via the internet 22.

Each member's card 16 stores card data 16a. The card data 16a includes player information of the game player who owns the member's card, competition result data, character setting data, nickname data, etc.

An example of the card data 16a is illustrated in FIG. 4A. The card data 16a stores as the player information an ID for discriminating the member's card from the other member's cards, a password set when the member's card was made, an account name (user's name) set when the member's card was made, user information, such as sex, age, the name of a game center which has issued the member's card, etc. As the competition result data, a number of matches of the competitive games, a win number, a rank given in accordance with results of wins and losses, etc., and others are recorded. As the character setting data, character names selected by the game player, costumes and items held by the characters, and others are recorded. As the nickname data, Nickname 1, Nickname 2, . . . , are recorded as information of given names.

The game server 30 stores user data 30a, 30b, . . . of all the registered users.

An example of the user data 30a, 30b, . . . is illustrated in FIG. 4B. Each user data 30a, 30b, . . . includes the player information, the competition result data, the character setting data, the nickname data, etc. recorded in the member's card 16, and additionally, all related information, such as a history the competition so far made, etc. The competition history includes competitor users, competition results, competition periods of time, winning tricks, generated nicknames, etc.

The member's card 16 mainly stores current information of the game player, e.g., his account name, ID and password, current states of the player character, e.g., costumes, items, such as accessories set on the current character, the current nickname, etc., but the server 30 stores, in addition to the information recorded in the member's card 16, progress of the game, costumes and items so far obtained based on competition results, and history information, such as nicknames, etc.

The server 30 stores information larger than the information recorded in the member's card 16 because the former has a larger storage capacity of the latter and, in addition, so that other terminals, such as personal computers, portable terminals, etc., make access to the server 50 so as to change settings of game characters with so far obtained costumes, items, nicknames, etc.

The contents of changes are stored in the server 30 and, when the next game is played, are read from the server 30 to be set as game parameters and are reflected in processing the game and producing images.

Information is recorded in also the member's card 16 so as to make the server 30 and the member's card correspond to each other (for authentication) and also so that when the server 30 cannot be used for some reason, a game is played without using the sever or when a game does not require the server, player character are set, based on the information stored in the member's card to play the game.

As illustrated in FIG. 3, In the game device 12, first player data 12a and second player data 12b of 2 game players who play the fighting game are stored. In the game device 12, competition data 12c formed during the execution of the game and details of the competition of the game is temporarily stored. In the game device 12, a nickname table 12 for giving nicknames is stored.

As the player data 12a, 12b, the card data 16a read from the member's cards of the game players and data of the game players obtained from the game server 30 are stored.

As the competition data 12c, detailed data of the executed competitive fighting game, e.g., names of competing players, a stating time of the competition, a finishing time of the competition, progress of the play, the winner, a winning trick, data of counted number of items corresponding to conditions for giving nicknames, generated nicknames, account names the nicknames have been given to, etc. are stored.

An examples of the competition data 12c is illustrated in FIG. 5A. As the competition player names, Player 1 and Player 2 are stored, and as the competing time, a competition starting time and a competition finishing time are stored, the win and loss of the competition and a winning trick are stored.

As the play progress, for each item set for giving nicknames, a counter of times of the items have been generated, and given nicknames are recorded. For the throw item, for example, a throw counter and the throw nickname are recorded. For the guard item, a guard counter and the guard nickname are recorded for the reaction item, a reaction counter and the reaction nickname are recorded. For the retreat item, a retreat counter and the retreat nickname are recorded. Furthermore, a collective nickname given based on the counters and the nicknames of the respective items is recorded. They are recorded respectively for Player 1 and Player 2. The respective items set for giving nicknames will be detailed later.

As the nickname table 12d, a plurality of levels are set for each item set for giving nicknames, and judgment conditions and given nicknames are set for each level.

An example of the nickname table 12d is illustrated in FIG. 5B. In the throw item for the throw trick, Throw Condition 1 of Level 1 and a throw nickname, "Throw Apprentice", Throw Condition 2 of Level 2 and a throw nickname "Throw Disciple", Throw Condition 3 of Level 3 and a throw nickname "Throw Master", Throw Condition 4 of Level 4 and a throw nickname "Throw Teacher", and Throw Condition 5 of Level 5, a throw nickname "Throw Champion" are set.

As illustrated in FIG. 5B, in addition to the throw item, the item of throw evasion in which a throw trick is returned to evade the throw, the item of continuous tricks in which continuous tricks are made, the item of retreat in which a treat is made in a competition, the item of counterattack following defense in which a defense is made and an attack is made, the item of defense in which a defense is made, the item of large trick in which a large trick is made are provided. For each item, judgment conditions and given nicknames are set for each of Levels 1 to 5.

(Nicknaming System)

The nickname system characterizing the present embodiment will be detailed.

The nicknaming system is for giving a name, i.e., "a nickname" to a game player having specific techniques more than set, which are judged to satisfy prescribed conditions. The "nickname" is the name which a person is commonly known by.

The ranking system for giving a class (the first class, the second class, the third class, . . . ) or a rank (the first rank the second rank, the third rank, . . . ), based on a win number or a win rate is provided. The nicknaming system is different from the ranking system. In the ranking system, the judgment is based on wins and losses, but in the nicknaming system, individualities of the fighting manner of a game player are expressed by a nickname.

That is, the nicknaming is not related with the win and loss and the win rate, and only characterizes a playing style of a game player. For example, a game player has mastered only one technique, but while having mastered the technique, he has ignored techniques required throughout a game. Resultantly, he loses. The retreat item set for the nicknaming characterizes a game player who does not positively fight with the competitor and retreats.

In the nicknaming system, for example, the throw item, the throw evasion item, the guard item, reaction item and the retreat item are set. The throw item is for giving a nickname to a game player who is good at the throw trick. The throw evasion item is for giving a nickname to a game player who is good at evading a throw trick played on him by the competitor. The guard item is for giving a nickname to a game player who is good at guarding against a trick played by a competitor. The reaction item is for giving a nickname to a game player who is good at attacking quickly after guarded against a trick played by a competitor. The retreat item is for giving a nickname who only retreats without attacking against attacks made by a competitor.

For each item, prescribed judgment conditions are set, and times of satisfying the prescribed judgment conditions are counted. For each nickname, levels are set for each item, and a nickname is given to each level.

The number of matches is not limited to 20 and can be a prescribed number. Based on a counted number of each match, it may be judged whether or not a nickname can be given.

The judgment as to whether or not a nickname is given may not be made, making no change to a nickname during a prescribed number of matches, e.g., 20 matches from the time when a nickname has been given to a certain item for the first time or when a nickname has been leveled up. It can more impress the individuality of a game player not to change a nickname of the game player for a certain period of time.

(Nickname Levels and Judgment Conditions)

The levels and judgment conditions of each item of the nicknaming system will be explained by means of the throw item.

The throw item is basically judged, based on throw trick determining conditions for judging whether or not a throw trick is winning. The throw trick deciding conditions are decided based on key operations of Player 1 and Player 2, and motions of the Player 1 and Player 2.

As additional conditions, stiffening conditions for judging whether or not a competitor has been stiffened immediately after an attack trick is made or on other occasions, and damaging conditions for judging whether or not a competition has been much damaged are added.

Every time the throw trick determining condition is satisfied, the throw counter of the competition data 12c is incremented, and when the count value arrives at a prescribed value, a nickname is given.

The throw condition 1 of Level 1 of the throw item is whether or not the throw trick has been made 40 or more times. The nickname for Level 1 is "Throw Apprentice".

The throw conditions 2 of Level 2 of the throw item is whether or not the throw trick has been made 50 or more times. The nickname for Level 2 is "Throw Disciple".

The condition for Level 3 of the throw item is the stiffening condition judging whether or not a competitor has not moved in addition to the throw condition 2 of Level 2. Level 3 is decided, based on whether or the throw trick has been made 10 or more times while a competitor is stiffening. The nickname of Level 3 is "Throw Master".

Level 4 of the throw item is decided, based on whether or not the throw trick has been made 20 or more times while a competitor is stiffening. The nickname of Level 4 is "Throw Teacher".

The condition 5 of Level 5 of the throw item is the damaging condition judging whether or not a competitor has been damaged in addition to the throw condition 4 of Level 4. Level 5 is decided, based on whether or not a competitor has been much damaged 20 or more times. The nickname of Level 5 is "Throw Champion".

For the throw evasion item, the continuous trick item, the retreat item, the after defense counterattack, the defense item for defending, the large trick item, as illustrated in FIG. 5B, suitable judgment conditions and their own nicknames are respectively set.

As described above, as the levels are higher, a count value for satisfying the condition of a higher level is set to be larger, whereby the individuality of a game player can be expressed clearly with respect to other game players.

(Game Images Display)

The game images using the nicknaming system of the present embodiment will be explained with reference to FIGS. 6 and 7.

FIG. 6 is a game image of a competition of a fighting game. Information of Player 1 is displayed on the left side of the game image, and on the right side of the game image information of Player 2 is displayed. On upper left and right parts of the game image, player character display regions A1, A2 where player characters "SHUN" and "JEFFERY" selected by the game players are displayed are provided. Below the regions, account name display regions B1, B2 where "Hiroshi" and "Yohsuke" which are account names of the game players are provided.

Beside the player character display regions A1, A2, rank display regions C1, C2 where "Rank 9" and "Rank 10" which are ranks given to Player 1 and Player 2 are displayed.

At lower left and right parts of the game image, competition history data display regions D1, D2 where competition display data of wins and losses, win rates, etc. of Player 1 and Player 2, "1 win 19 losses 5.0%" and "8 wins 56 losses 12.5%" are provided.

Below the competition history data display regions D1, D2, nickname display regions E1, E2 where nicknames of Player 1 and Player 2 "Apprentice Chicken" and "Throw Mater" are provided. For the ON/OFF of the display of the nicknames, in default, the display is set at ON, but when the players select in advance, it is possible not to display the nicknames. When no nickname is given, nothing is displayed in the nickname display regions E1, E2.

When a plurality of nicknames are given to 1 game player, all the given nicknames may be displayed, a nickname of a higher level may be automatically displayed, or a nickname selected by the game player may be displayed.

When a membership system in which a member game player is free, and a non-member game player pays is used, the nickname is displayed for the member game player, but for the non-member game player, the nickname may not be displayed.

FIG. 7 is a game image displayed when a nickname is raised to a higher level. The winning pose of a winning character is displayed at the center of the game image, while "Raised to Blue Lightning!" is displayed at the center of the game image, which means the game player has obtained a nickname of a higher level. This makes the game player more ambitious of the game.

The obtained nickname "Blue Lightning" is not only displayed on the game image, but also may be outputted in sounds by the sound processor 56 reading sound information which has been stored in advance, related to the nickname in the sound memory 58. This nickname may be recorded in a storage medium, such as an IC card or others, belonging to the game player or may be outputted to the game server as player information.

(Progress of the Fighting Game)

The progress of the fighting game of the present embodiment will be explained with reference to FIGS. 8 to 10.

As illustrated in FIG. 8, a game player inserts coins into the game device 12 installed in the amusement facilities 10 and inserts his member's card 16 (Step S10). In the domestic game device, the insertion of coins is omitted.

The game device 12 reads card data 16a stored in the member's card 16 inserted into the game device 12 and stores the card data 16a in the system memory 42 of the game device 12 while transmitting the card data 16a to the game server 30 via the internet 22 (Step S11).

The game server 30 stand by, awaiting the card data from the game device 12 (Step S20), and when the game server 30 receives the card data 16a, the game server 30 extracts corresponding user data 30a from data stored in the game server 30 with the ID, for example, of the card data 16a as the key (Step S21). Subsequently, the game server 30 transmits the extracted user data 30a to the game device 12 (Step S22).

The game device 12 stands by, awaiting the user data 30a from the game server 30 (Step S12), and when the game device 12 receives the user data 30a from the game server 30, the game server 30 stores the user data 30a in the system memory 42, related with the card data 16a. At this time, when another terminal has already made access to the server and changed the setting of the player, the setting is reflected in the contents of the game to be executed. The Player 1 data 12a of Player 1 of the competing pair includes the card data 16a and the user data 30a.

For Player 2, who is the other of the competing pair, similarly, the Player 2 data 30b is formed of the user data 30b extracted from the game server 30, based on the card data 160a of the member's card 16.

When the Player 1 data 30a and the Player 2 data 30b have been prepared, the fighting game is executed, and competition data 12c is generated (Step S14). When the fighting game is finished, the nicknaming processing characterizing the present embodiment is performed, based on the generated competition data 12c (Step S15). The competitive game processing and the nicknaming processing will be detailed later.

When the competitive game processing and the nicknaming processing have been completed, the game device 12 rewrites the card data 16a recorded in the member's cards 16 of both competing game players, based on the competition data 12c and ejects the member's cards 16 (Step S16). Subsequently, the game device 12 transmits the competition data 12c and the obtained nickname information to the game server 30 (Step S17).

When the game server 30, which has stood by, awaiting the data from the game device 12 (Step S23) received the data from the game device 12, the game server 30 adds the competition data 12c and the obtained nickname information to the data 30a, 30b of the registered users who have competed with each other to thereby replace the data 30a, 30b with the contents of the renewed data (Step S24).

(Competitive Game Processing)

The competitive game processing will be detailed with reference to FIG. 9.

When a competitive game is started, a region for competition data 12c to be stored is set in the system memory 42 of the game device 12 (Step S30).

Subsequently, the competitive game is started. The processing other than the processing related to the nicknaming of the throw item and throw evasion item will not be described.

It is judged whether or not a win and loss has been decided (Step S31), and when the win and loss has not yet been decided, it is judged whether or not his own character has thrown the competitor player character (Step S32). In the competitive fighting game, a parameter (life parameter) whose value is decreased by being given a trick by the competitor player character or others is set for each of the player characters, and the win and loss is decided based on which life parameter has a larger value at the time when the life parameter of either of the characters becomes zero or a prescribed value, or at the time when a prescribed period of time has passed.

When it is judged that his own player character has thrown, subsequently it is judged whether or not the competitor player character has evaded throw (Step S33). When it is judged that the competing player character has evaded the throw, a throw evasion count of the competition data for the competing character is increased by one (Step S34). When it is judged that the competitor player character could not evade the throw, the throw count of the competition data for his own play character is increased by one (Step S35).

Next, reversely, it is judged whether or not the competitor play character has thrown his own play character (Step S36).

When it is judged that the competitor player character has throw, subsequently, it is judged whether or not his own player character has evaded the throw (Step S37). When it is judged that his own play character has evaded the throw, the throw evasion count of the competition data for his own player character is increased by one (Step S38). When it is judged that his own layer character could not evade the throw, the throw count of the competition data for the competitor player character is increased by one (Step S39).

This processing is repeated until the win and loss is decided. When the win and loss is decided, the nicknaming processing follows.

In Step S32 in FIG. 9, it is possible that it is judged whether his own player character has thrown the competitor player character or the latter has thrown the former, and when his own player character has thrown the competitor player character, Steps S33 to Step S35 are executed, and Step S31 follows, but when the competitor player character has thrown his own player character, Steps S37 to Step S39 are executed, and Step S31 follows.

(Nicknaming Processing)

The nicknaming processing will be detailed with reference to FIG. 10.

When the competitive game is completed, the competition data 12c is added to the player data 12a, 12b in the system memory 42 of the game device 12 (Step S40). Specifically, the count values of the respective items of the nicknaming system of the competition data 12c are added to the count values of the respective items of the nicknaming system of the player data 12a, 12b.

Subsequently, count values of the respective items of the nicknaming system of the player data 12a, 12b are compared with the count values of the respective conditions of the respective items of the nicknaming system in the nicknaming table 12d. For example, the throw count values and the throw evasion count values of the player data 12a, 12b are compared with the count values of the throw condition and the throw evasion condition of the nicknaming table 12d (Step S41).

Based on a result of the comparison in Step S41, it is judged whether or not the nicknaming is performed (Step S42). When it is judged that the nicknaming is performed, subsequently, it is judged whether or not a plurality of nicknames are given (Step S43).

When a plurality of nicknames are given, a nickname to be set for the player character is selected (Step S44). For example, out of said a plurality of nicknames, those which are of higher level may be automatically selected, or those the players like to display may be selected.

Subsequently, nickname information is generated based on the given nicknames, and the player data 12a, 12b are renewed (Step S45). The nicknaming processing is completed. When the nicknaming processing is completed, the processing returns to Step S16 in FIG. 8.

A plurality of given nicknames including those which have not been selected are transmitted to the server 30.

The above-described the progress and the competitive game processing, and the nicknaming processing are executed for each player, and even when a plurality of players concurrently play, the judgment as to whether or not nicknames to be given, and the nicknaming processing are performed for the respective players.

(Game Progress Judgment Processing)

The throw judgment processing (Step S32), the throw evasion judgment processing (Step S33), etc. of the competitive game processing described above are game progress judgment processing for judging whether or not the game progress which has been anticipated is made by operations of the players.

Figure 11:
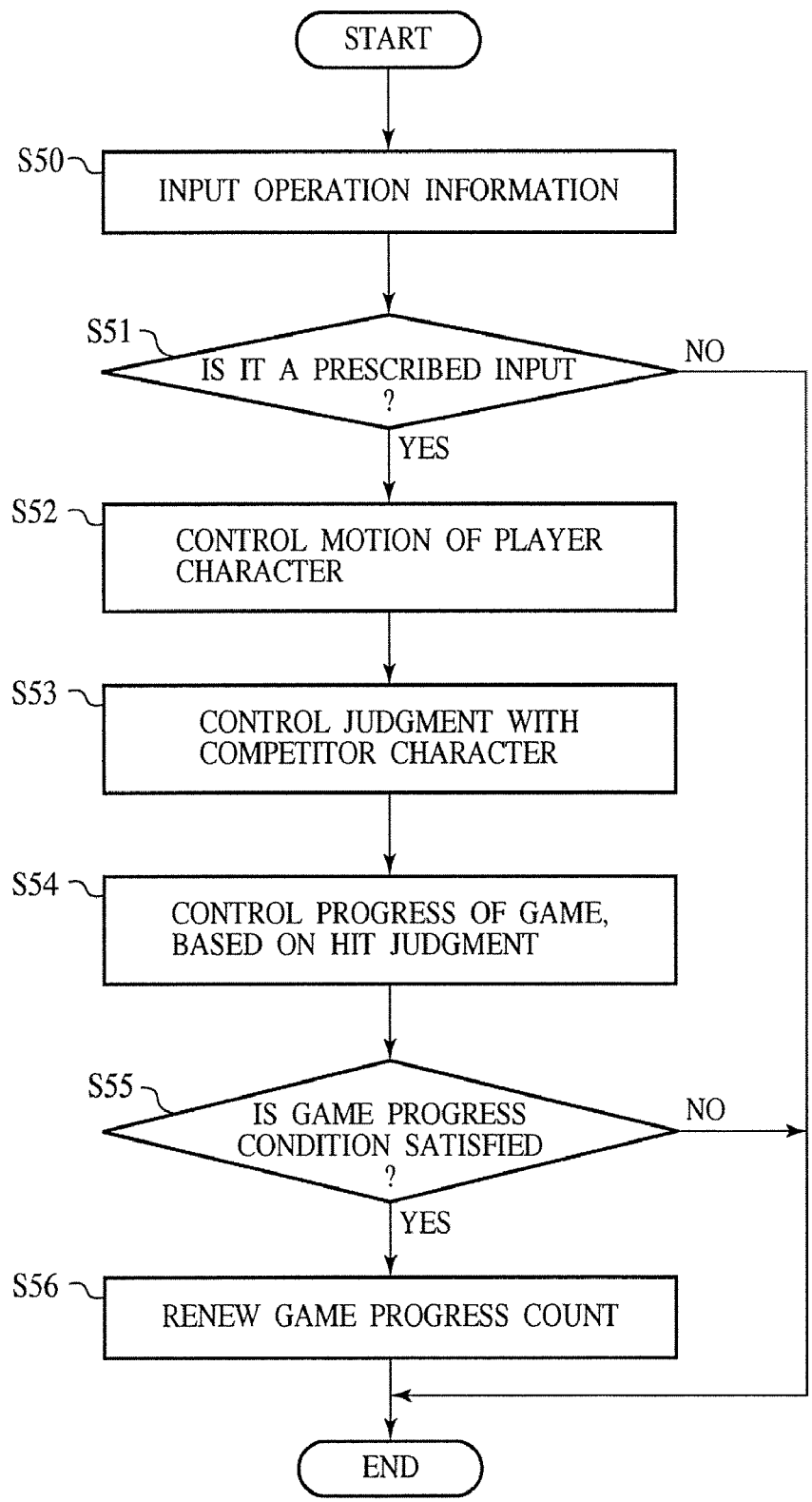
FIG. 11 is a flow chart of the flow of the game progress judgment processing of the fighting game of the embodiment of the present invention.

One example of the game progress judgment processing is illustrated in FIG. 11. In this example, it is judged whether or not conditions for prescribed game progress have been satisfied by operations of a single kind, such as command input, etc. by players.

Operation information of an operation by a player is inputted (Step S50), and it is judged whether or not the operation information is a prescribed operation input (Step S51). When the operation information is not the prescribed operation input, the game progress judgment processing is ended.

When the operation input is the prescribed one, the motion control of the player character is performed based on the operation information (Step S52). Subsequently, with the player character set in motion, the judgment control of the strike with the competitor player character is performed (Step S53). Then, based on the strike judgment, the progress control of the game is performed (Step S54).

Next, it is judged whether or not the control of the game progress has satisfied prescribed conditions for the game progress (Step S55). When the prescribed conditions for the game progress have not been satisfied, the game progress judgment processing is ended. When the prescribed conditions for the game progress are satisfied, the count value, such as the throw count or the throw evasion count, is increased by one and is renewed(Step S56).

As described above, according to the present embodiment, a nickname which expresses the individuality of a game player corresponding to his expertness of techniques, whereby the individuality of a competitor can know in advance, which makes the competitive game amusing.

Modified Embodiments

The present invention is not limited to the above-described embodiment and can cover other various modifications.

For example, in the above-described embodiment, the present invention is applied to the competitive fighting game which is played 1 vs. 1 by game player 1. However, the present invention is applicable to competitive games which are played 1 player vs. a plurality of players or a plurality of players vs. a plurality of players.

Competitors are not essentially game players and may be characters (non-player characters) controlled by the CPU of the game device executing programs.

In this case, the game device and the server may transmit and receive the user data of 1 player.

The present invention is applicable to other games different from the competitive fighting game. For example, the present invention is applicable to race games which are competed in own techniques whether the race games are competitive or not.

That is, not only in the fighting game described in the embodiment, but also in computer games in which the game progress is changed by operation inputs by players irrespective of the presence of the member's card 16 and the communication network, nicknames corresponding to the game progress can be given, depending on how the game has been advanced by the program executed by the computer in accordance with operation inputs by the players.

For example, in applying the present invention to a race game in which vehicles, such as cars, etc. run, nicknames are given, depending on how well the players make drift drive. The drift drive is made by combinations of braking operations and steering operations. The success of a drift drive is judged by comparing a drive speed after the end of the drift drive with a drive speed before the start of the drift drive and judging whether a difference between both drive speeds is within a prescribed value. Based on a result of the judgment, the count value for the drift drive is renewed, and a nickname corresponding to an accumulated count value is given. The skill of the drift drive may be judged by judging whether or not the drift drive has been returned to the initial drive without touching any obstacles in or after the drift drive.

Figure 12:
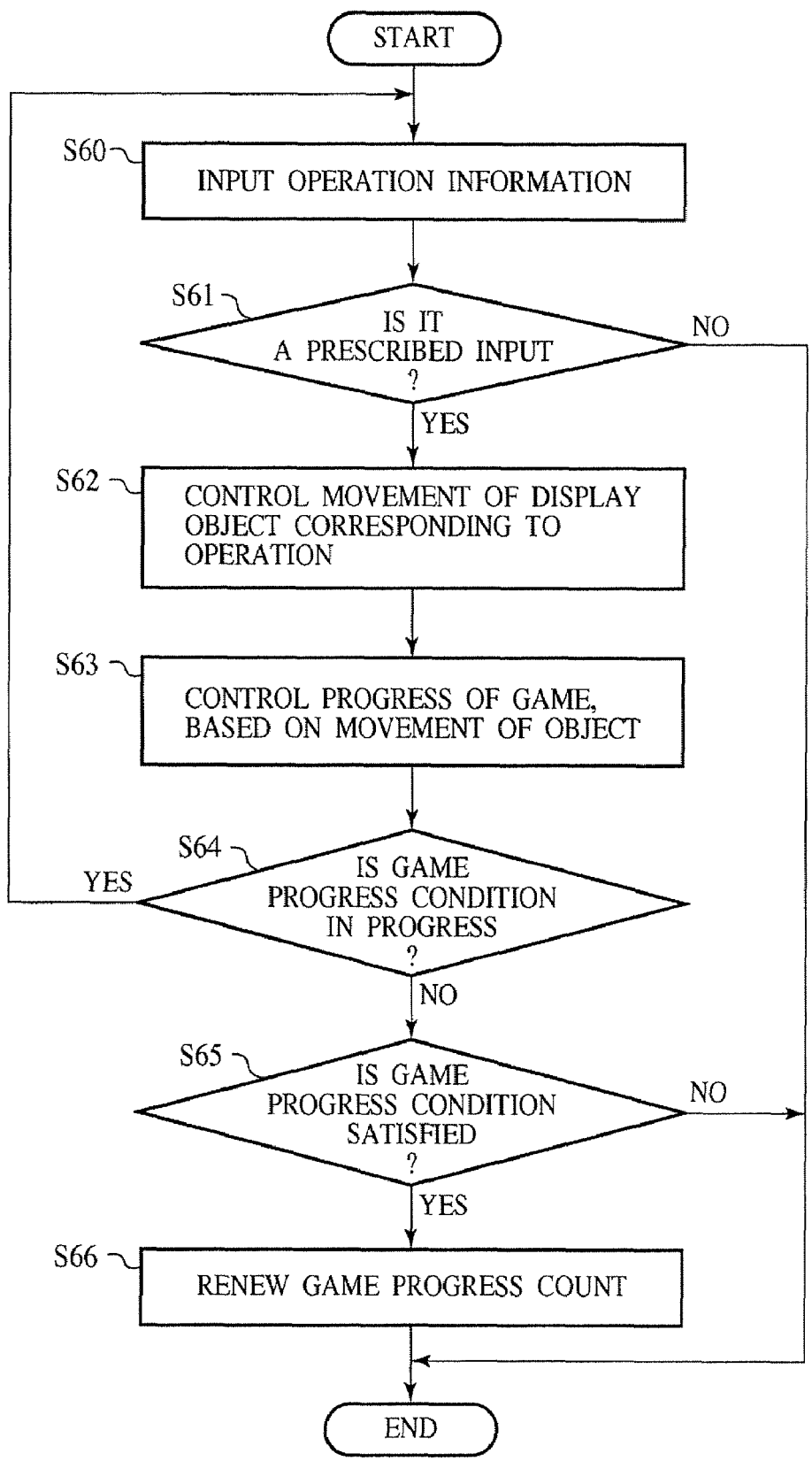
FIG. 12 is a flow chart of the flow of the game progress judgment processing of a race game according to another embodiment of the present invention.

On example of the game progress judgment processing in a race game is illustrated in FIG. 12. In this example, it is judged whether or not continuous operations, i.e., operation inputs and game progress are repeated by a game player have satisfied the game progress conditions.

When operation information of an operation by a game player is inputted (Step S60), it is judged whether or not the operation information is a prescribed operation input (Step S61). When the operation information is not the prescribed operation, the game progress judging processing is ended.

When the operation information is the prescribed operation input, the movement of a race car which is a display object is controlled based on the operation information (Step S62). Subsequently, based on the movement of the object, the progress of the game is controlled (Step S63).

Next, it is judged whether or not the game progress conditions are in progress (Step S64). When the game progress conditions are in progress, the processing is returned to Step S60. When the game progress conditions are not in progress, i.e., the game progress, such as the drift is outputted or others, is finished, then it is judged whether or not the game progress control has satisfied the prescribed game progress conditions (Step S65). When the prescribed game progress conditions are not satisfied, the game progress judgment processing is ended. When the prescribed game progress conditions are satisfied, 1 is added to the game progress count, and the count is renewed. (Step S66).

Then, after Step S63, it is judged whether or not the game progress is interrupted by the failure of the drift drive or others. When it is judged that the game progress has been interrupted, the game may be ended.

Furthermore, in a race game in which not only vehicle, but also men and animals are run, based on how many of the running objects have passed or how many of the running objects have been passed in a prescribed period of time in a race or in a prescribed number of races, nicknames set for numbers thus given may be given.

In applying the present invention to mahjong game, counters are set for winning combination (tanyao, sanshoku, daisangen, etc.) and winning way (standing hand winning, tumo winning, etc.), nicknames corresponding to the count numbers are set, and the nicknames are given corresponding to the winning combination and winning way. It is also possible that counters are set corresponding to actions (pong, chow, kong, etc.) of game players, which are not related directly to wins and losses of mahjong, nicknames are set corresponding to the count values, and the nicknames corresponding to actions of game players are given.

What is claimed is:

1. A game device on which a competitive game is played by a plurality of game players and which comprises control means for controlling the game by operation means operated by the game players and displaying game images on display means, further comprising:
storage means for storing a count value indicating a number of times of a prescribed trick played by the game player, and a nickname table including a plurality of levels for the prescribed trick, a plurality of nickname conditions respectively corresponding to the plurality of levels, and a plurality of player's nicknames respectively corresponding to the plurality of nickname conditions,
the plurality of nickname conditions being determined at least based upon the number of times the prescribed trick was played by the game player,
the player's nicknames only expressing individualities of the fighting manner of the game player and are not related to the win and loss of the competitive game;
the control means:
judging whether or not the prescribed trick has been played, based on operation states of the operation means by the game players in the progress of the game;
renewing the count value when it is judged that the prescribed trick has been played; and
giving the player's nickname based upon said nickname table to the game player when the count value has satisfied one of the nicknaming conditions in said nickname table,
the display means displaying on the game screen the player's nickname given to the game player with a player's name previously registered by the game player, when the display is set at ON, and
the display means displaying on the game screen the player's name but not displaying on the game screen the player's nickname, when the display is set at OFF according to a player's selection.

2. A game device according to claim 1, wherein the control means:
accumulates the count values played in a plurality of times of the competitive game; and
judges based on the accumulated count values whether or not one of the nicknaming conditions is satisfied.

3. A game control method for controlling a competitive game played by a plurality of game players to decide the win and loss on a game device comprising control means for controlling the game by operation means operated by the game player and displaying a game image on display means,
a count value indicating a number of times a prescribed trick was played by the game player, and a nickname table including a plurality of levels for the prescribed trick, a plurality of nickname conditions respectively corresponding to the plurality of levels, and a plurality of player's nicknames respectively corresponding to the plurality of nickname conditions being stored,
the plurality of nickname conditions being determined at least based upon the number of times the prescribed trick was played by the game player;
the player's nicknames only expressing individualities of the fighting manner of the game player and are not related to the win and loss of the competitive game;
the method comprising the steps of:
judging whether or not the prescribed trick has been played, based on operation states of the operation means by the game players in the progress of the game;
renewing the count value when it is judged that the prescribed trick has been played; and
giving the player's nickname based upon said nickname table to the game player when the count value has satisfied one of the nicknaming conditions in said nickname table, and
the display means displaying on the game screen the player's nickname given to the game player with a player's name previously registered by the game player, when the display is set at ON, and
the display means displaying on the game screen the player's name but not displaying on the game screen the player's nickname, when the display is set at OFF according to a player's selection.

4. A game control method according to claim 3, further comprising the steps of:
accumulating the count values played in a plurality of times of the competitive game; and
judging whether or not one of the nicknaming conditions is satisfied, based on the accumulated count value.

5. A computer readable storage medium storing a program for executing a competitive game in which a plurality of game players compete to decide the win and loss on a game device comprising control means for controlling the game by operation means operated by the game player and displaying a game image on display means,
a count value indicating a number of times a prescribed trick was played by the game player, and a nickname table including a plurality of levels for the prescribed trick, a plurality of nickname conditions respectively corresponding to the plurality of levels, and a plurality of player's nicknames respectively corresponding to the plurality of nickname conditions being stored,
the plurality of nickname conditions being determined at least based upon the number of times the prescribed trick was played by the game player;
the player's nicknames only expressing individualities of the fighting manner of the game player and are not related with the win or loss of the competitive game;
the program permitting the game device to execute the steps of:
judging whether or not the prescribed trick has been played, based on operation states of the operation means by the game players in the progress of the game;
renewing the count value when it is judged that the prescribed trick has been played; and
giving the player's nicknames based upon said nickname table to the game player when the count value has satisfied one of the nicknaming conditions in said nickname table,
the displaying means displaying on the game screen the player's nickname given to the game player with a player's name previously registered by the game player, when the display is set at ON, and
the display means displaying on the game screen the player's name but not displaying on the game screen the player's nickname, when the display is set at OFF according to a player's selection.

* * * * *